(12) United States Patent
Chapman et al.

(10) Patent No.: US 9,625,036 B2
(45) Date of Patent: Apr. 18, 2017

(54) BRAKING SYSTEM

(71) Applicant: Caterpillar SARL, Geneva (CH)

(72) Inventors: John Chapman, Peterlee (GB); David Thompson, Chester-Le-Street (GB); Andrew Colin Ellis, Gateshead (GB); Anthony James Pollock, Wolviston (GB); Roger William Tansley, Darlington (GB); James Tarelli, Darlington (GB); Neil Taylor, Cramlington (GB); Samuel Alec Roberts, Stanmford (GB)

(73) Assignee: Caterpillar SARL, Geneva (CH)

( * ) Notice: Subject to any disclaimer, the term of this patent is extended or adjusted under 35 U.S.C. 154(b) by 47 days.

(21) Appl. No.: 14/274,246

(22) Filed: May 9, 2014

(65) Prior Publication Data
US 2015/0323071 A1   Nov. 12, 2015

(51) Int. Cl.
| | |
|---|---|
| F16H 59/54 | (2006.01) |
| B60T 11/10 | (2006.01) |
| F16H 61/16 | (2006.01) |
| B60W 10/10 | (2012.01) |
| F16H 63/48 | (2006.01) |
| B60T 7/12 | (2006.01) |
| B60T 13/68 | (2006.01) |
| B60T 7/08 | (2006.01) |
| B60T 13/66 | (2006.01) |

(52) U.S. Cl.
CPC ............ *F16H 63/486* (2013.01); *B60T 7/085* (2013.01); *B60T 7/12* (2013.01); *B60T 11/103* (2013.01); *B60T 13/662* (2013.01); *B60T 13/686* (2013.01); *F16H 59/54* (2013.01); *F16H 61/16* (2013.01)

(58) Field of Classification Search
CPC ...... F16H 59/54; F16H 63/486; B60T 11/103; B60T 11/105; B60T 7/12; B60K 41/26
USPC ............................................... 192/219, 219.1
See application file for complete search history.

(56) References Cited

U.S. PATENT DOCUMENTS

| | | | | |
|---|---|---|---|---|
| 6,938,509 B2 * | 9/2005 | Bulgrien | ............. | F16H 59/0217 192/219.6 |
| 7,281,602 B2 * | 10/2007 | Svensson | ................. | B60P 1/04 180/333 |
| 7,484,816 B2 * | 2/2009 | Maruyama | .............. | B60T 7/122 303/191 |
| 2003/0111891 A1 | 6/2003 | Svensson | | |
| 2007/0114841 A1 | 5/2007 | Maruyama et al. | | |

FOREIGN PATENT DOCUMENTS

WO          8906197          7/1989

* cited by examiner

*Primary Examiner* — Jacob S Scott
*Assistant Examiner* — Tinh Dang

(57) ABSTRACT

The present disclosure relates to a vehicle having a braking system and a method of engaging the braking system. The braking system engages a brake mechanism as a waiting brake. The vehicle has a dual function device which is configured such that when the dual function device is activated when the vehicle transmission system is in a drive mode, the transmission system is maintained in that drive mode, and when the dual function device is activated when the transmission system is in the neutral mode, the brake mechanism is engaged.

22 Claims, 6 Drawing Sheets

BRAKING SYSTEM

TECHNICAL FIELD

The present disclosure relates to a vehicle having a braking system and a method for engaging the braking system and, more particularly, to a braking system for engaging a brake mechanism as a waiting brake.

BACKGROUND

Load carrying vehicles, including trucks, wheel loaders and the like, are commonly employed during construction and excavation for transporting loads from one point to another. The surface on which such vehicles operate is typically uneven with inclined surfaces (known as grades).

Load carrying vehicles generally have a "parking brake" system, which is intended for use when the vehicle is not being operated. In such situations the vehicle is brought to a halt on level ground, the parking brake is engaged, the engine is switched off and the vehicle operator (driver) leaves the cab. However there are a number of situations in which the vehicle must be stopped temporarily, with the engine still running with the operator remaining in the cab. Such temporary stops are required during or waiting for loading and dumping. For temporary stops, such vehicles are generally equipped with a "service brake" system, usually activated by the operator via a foot pedal. The loading and dumping operations may take place on a grade, which means that the operator may need to sit with their foot pressed against the service brake pedal for several minutes at a time.

US-A-2003/0111891 and US-A-2007/0150120 describes an operator controlled device for a load carrying vehicle which, in a single operation, activates the service brakes and obtains a neutral position of the gearbox. This obviates the need for the operator to keep his foot pressed on the parking brake. However, before the vehicle can move off, the operator has to first move the gear lever from the position it was in when the device was activated through neutral and into the intended forward or reverse gear.

SUMMARY OF THE DISCLOSURE

According to the disclosure there is provided a vehicle comprising:
  a brake mechanism; and
  an automatic transmission system having a plurality of drive modes and a neutral mode,
said transmission system comprising a dual function device, said dual function device being configured such that:—
  when the dual function device is activated when the transmission system is in a drive mode, the transmission system is maintained in that drive mode; and
  when the dual function device is activated when the transmission system is in the neutral mode, the brake mechanism is engaged.

According to the disclosure there is further provided a method of engaging a brake mechanism in a vehicle having a braking system and an automatic transmission system having at least one drive mode and a neutral mode, said method comprising the steps of:
  placing the transmission system in neutral mode; and
  activating a dual function device,
said dual function device being configured such that:—
  when the dual function device is activated when the transmission system is in a drive mode, the transmission system is maintained in that drive mode; and
  when the dual function device is activated when the transmission system is in the neutral mode, the brake mechanism is engaged.

BRIEF DESCRIPTION OF THE DRAWINGS

Preferred embodiments of the braking system will now be described, by way of example only, with reference to the accompanying drawings in which:—

DETAILED DESCRIPTION

Figure 1:
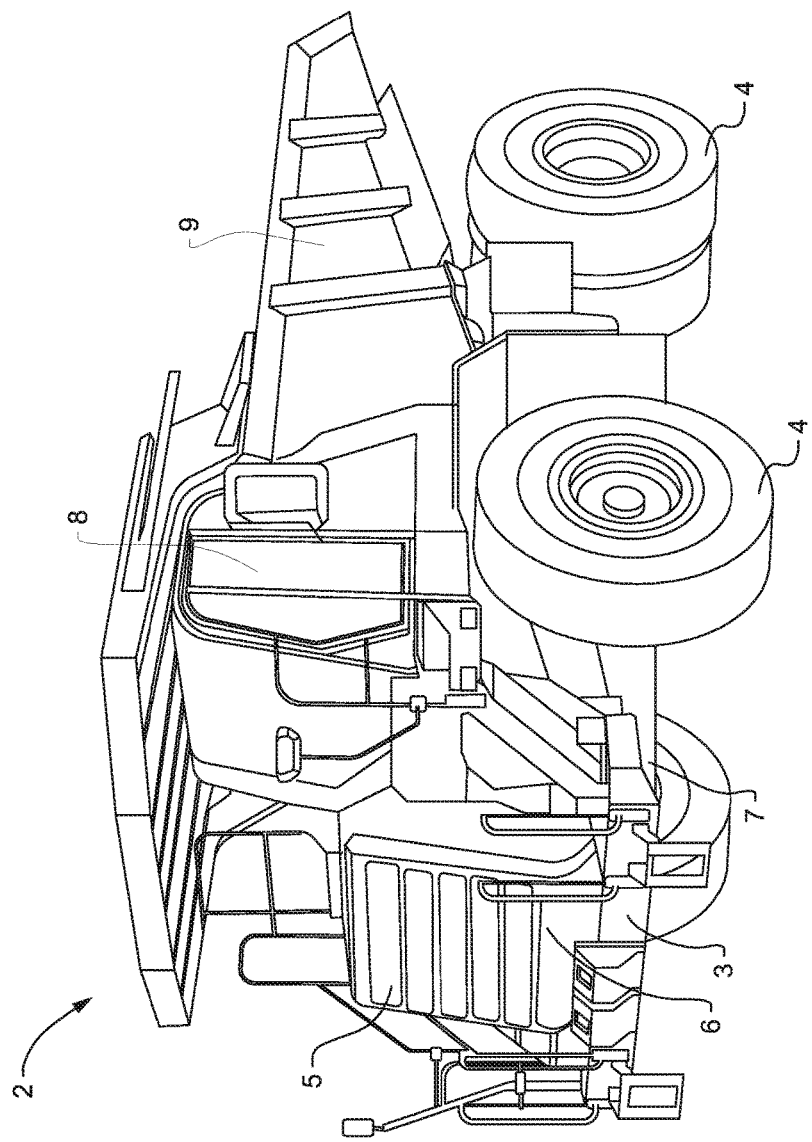
FIG. 1 is a perspective view of an exemplary vehicle incorporating the braking system in accordance with the present disclosure.

The braking system for the vehicle 2 of the present disclosure and the method for engaging the braking system may be used in any vehicle, in particular a load carrying vehicle, including articulated or non-articulated vehicles.

The vehicle 2 may comprise a chassis 3 mounted on wheels 4, and an engine 5, or another form of power unit, connected to the wheels 4 by a suitable transmission system 6. The transmission system 6 may be an automatic transmission system. The transmission system 6 may comprise a gearbox 7 which is operated by a transmission gear select lever 16, which enables the operator to select an appropriate gear or transmission mode for the operation of the vehicle 2. The transmission modes may include a neutral mode, in which the gear trains within the transmission system are disconnected, and one or more drive modes, such as forward (which allows the gear ratio to change automatically), reverse or one or more specific gears.

The vehicle 2 may comprise one or more electronic control units (ECUs) which are configured to monitor operating parameters and to control operation of the various vehicle systems and components. These ECUs will be collectively referred to herein as a computer control unit 14.

The vehicle 2 may comprise a cab 8 mounted on the chassis 3, in which the operator sits, which houses the controls for the vehicle. The controls may include one or more brake actuators (such as pedals) 20, the transmission gear select lever 16, one or more hoist levers (for operating the vehicle's working equipment) and a steering wheel. The vehicle may comprise a body 9 for carrying a load mounted on the chassis 3.

The vehicle 2 may be provided with a number of different brake mechanisms 11 or braking functions, which are intended to be used under different conditions. In this specification the following terminology will be used:

"parking brake" which is a brake mechanism intended for use when the engine 5 is not running and the vehicle 2 is unattended;

"service brake" which is a brake mechanism intended to be used for temporary stops whilst the operator is in the cab 8 and the engine 5 is running;

"engine compression brake" which is a brake mechanism used to assist in slowing down the vehicle 2; and "waiting brake" which is a braking function also intended to be used for temporary stops whilst the operator is in the cab 8 and the engine 5 is running which may utilise one or more of the aforementioned brake mechanisms.

These brake mechanisms 11 may comprise a plurality of separate brakes associated with each wheel 4 or some of the wheels 4 of the vehicle 2. For example the brake mechanism 11 may comprise front brakes and rear brakes for the front and rear wheels 4 of the vehicle 2 respectively. The brake mechanisms may be operated by an operator controlled brake actuator, such as a pedal, switch or lever in a known manner.

Figure 2:
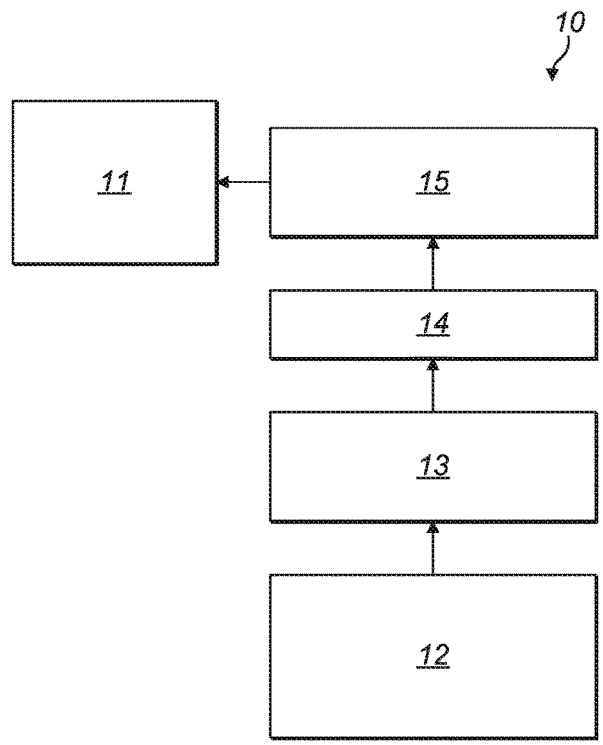
FIG. 2 is a schematic illustrating the operation of the braking system.

The operation of the braking system 10 is illustrated in its broadest sense in FIG. 2. The braking system 10 provides a waiting brake function which utilises a brake mechanism 11, which may be one or more of the parking brake, service brake or another form of brake. The waiting brake function may be requested by the operator at a user interface 12, for example by means of a button, switch, pedal, detent, or may be triggered automatically according to the machine state, as determined by the computer control unit 14. Software 13 may control the operation of the computer control unit 14, and may provide control logic for operation of the waiting brake function, based on signals received/provided by the computer control unit 14. The computer control unit 14 in turn may control an electrohydraulic brake control mechanism 15, which in turn may control the brake mechanism 11.

The control logic may use some or all of the following parameters:—
- transmission output speed
- engine speed
- vehicle speed (which may be determined by the transmission output speed)
- brake oil pressure
- brake valve status
- service brake actuator status
- ignition status
- rimpull level
- transmission gear status
- waiting brake user interface status The control logic may be set such that the waiting brake function is only activated if the vehicle is stationery, or moving at a very low speed, for example less than 1 mph, and the transmission system is in neutral. The control logic may require that the engine is running, that the vehicle ignition is in the run position and that the vehicle has a speed of zero. The control logic may require that the engine speed has been above a pre-set minimum engine speed for a pre-set minimum period of time. The minimum engine speed may be 500 rpm and the minimum period may be 2 seconds. The control logic may require that no faults are detected within the braking system 10 and that low brake pressure is not detected within the braking system 10. The control logic may require that the transmission output speed is below a pre-set maximum transmission output speed, which may be 30 rpm.

Figure 3:
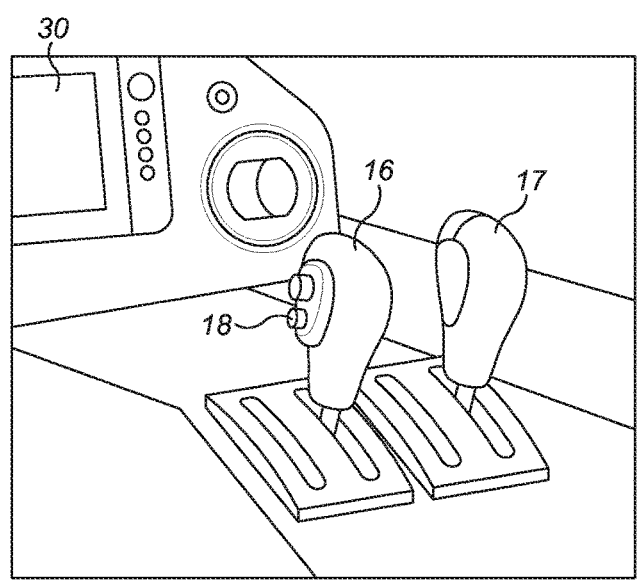
FIG. 3 is a perspective view of cab controls showing a transmission lever of the braking system of FIG. 1.

In one embodiment, the waiting brake function may be requested by the operator by the user interface 12. FIG. 3 shows a transmission gear select lever 16 which may be located adjacent a hoist lever 17, which may operate other apparatus of the vehicle 2. The transmission gear select lever 16 may be provided with a switch 18, which may be a button or detent or other form of actuator mounted on the transmission gear select lever 16. The switch 18 is one example of a user interface 12. Other forms of user interface 12 may also be used. It is known for load carrying vehicles 2 with automatic transmission systems 6 to be provided with a shift lock button, usually located on the transmission gear select lever 16, which holds the transmission 6 in a specific drive mode, usually a specific forward gear. The switch 18 in the braking system 10 of the present disclosure may be a dual function device. The switch 18 may be a momentary switch. The switch 18, when activated when the transmission 6 is in a drive mode, may act as such a shift lock button to prevent the transmission 6 from changing into a different gear. The switch 18, when activated when the transmission system 6 is in neutral mode, may activate the waiting brake function. When the switch 18 is activated when the transmission system 6 is in neutral mode, the computer control unit 14 may send a signal to the brake control mechanism 15, which may cause the brake mechanism 11 which is used in the waiting brake function to engage.

The control logic may require that the switch 18, or other waiting brake user interface 12, is pressed and held for a minimum period, which may be 0.5 seconds, before the waiting brake function is activated.

The control logic may require that a brake mechanism 11, which may be the same or different to the brake mechanism 11 which is used in the waiting brake function, is engaged before the waiting brake function is activated.

The service brake 19 may be configured to retard motion of the vehicle and may be a hydraulic pressure-actuated wheel brake such as, for example, a disk brake or a drum brake. The service brake 19 may be manually actuated by the operator by means of a service brake actuator 20, such as a foot pedal. The control logic may require that the service brake actuator 20 is manually actuated by the operator to apply the service brake 19 before the waiting brake function is activated. Thus where the brake mechanism 11 which is used in the waiting brake function is the service brake 19, the engagement of the service brake 19 is manually initiated by the operator and then maintained by the waiting brake function when the operator releases the service brake actuator 20.

Alternatively, the service brake 19 may be automatically actuated by the computer control unit 14 when the waiting brake function is requested at the waiting brake user interface 12.

Figure 4:
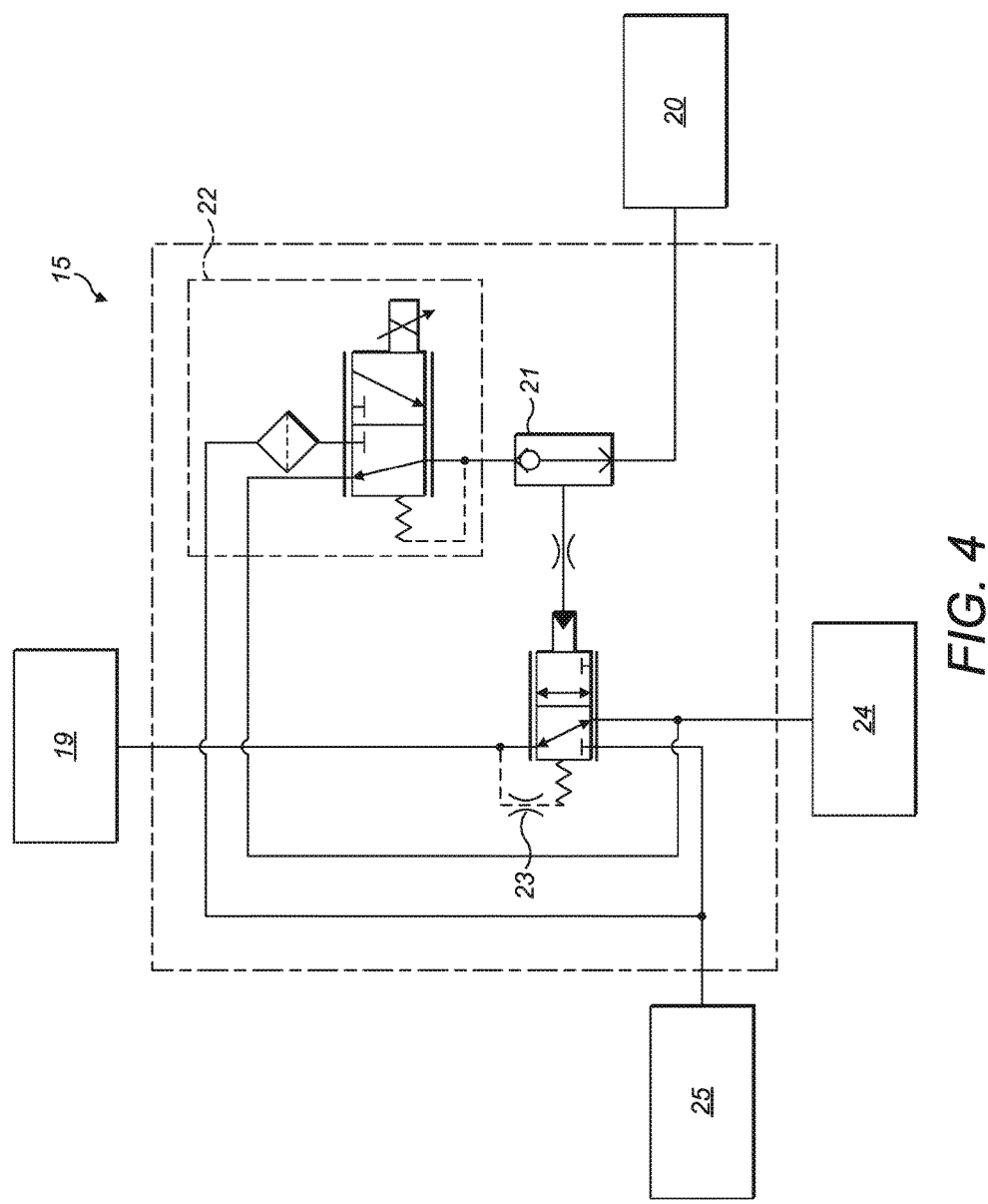
FIG. 4 is a diagram of a brake control mechanism of the braking system of FIG. 1.

Control of the service brake 19, or another brake mechanism 11, to provide the waiting brake function may be effected by the brake control mechanism 15. The brake control mechanism 15 may comprise one or more valves, which may include at least one automatic retard control (ARC) valves 22, as illustrated in FIG. 4. On operation of the service brake actuator 20, or the actuator of another brake mechanism 11, an actuator pressure signal 26 may be supplied to a pressure resolver 21. An automatic retard control (ARC) valve 22, which may be a solenoid valve, may supply a proportional ARC valve pressure signal 27 to the pressure resolver 21 based on inputs to the computer control unit 14. The pressure resolver 21 passes the higher of the actuator and ARC valve pressure signals 26,27 to a pressure relay 23. The pressure relay 23 multiplies the output signal from the pressure resolver 21 by a ratio and the resulting brake pressure signal 28 is sent to the service brake 19 or another brake mechanism 11. The brake control mechanism 15 may be supplied with pressurised hydraulic fluid (brake charge pressure 29) from a reservoir 24, such as a tank, by means of a pump 25.

Where the brake mechanism 11 comprises a plurality of separate brakes associated with each or some wheels of the vehicle, the brake control mechanism 15 may comprise an automatic retard control (ARC) valve 22 arranged to control each of the separate brakes. The brake control mechanism 15 may comprise additional valves controlled by the operation of the service brake actuator 20, or another brake actuator. These additional valves may control the service brake 19 (or other brake mechanism 11) directly or indirectly via the automatic retard control (ARC) valves 22.

Figure 5:
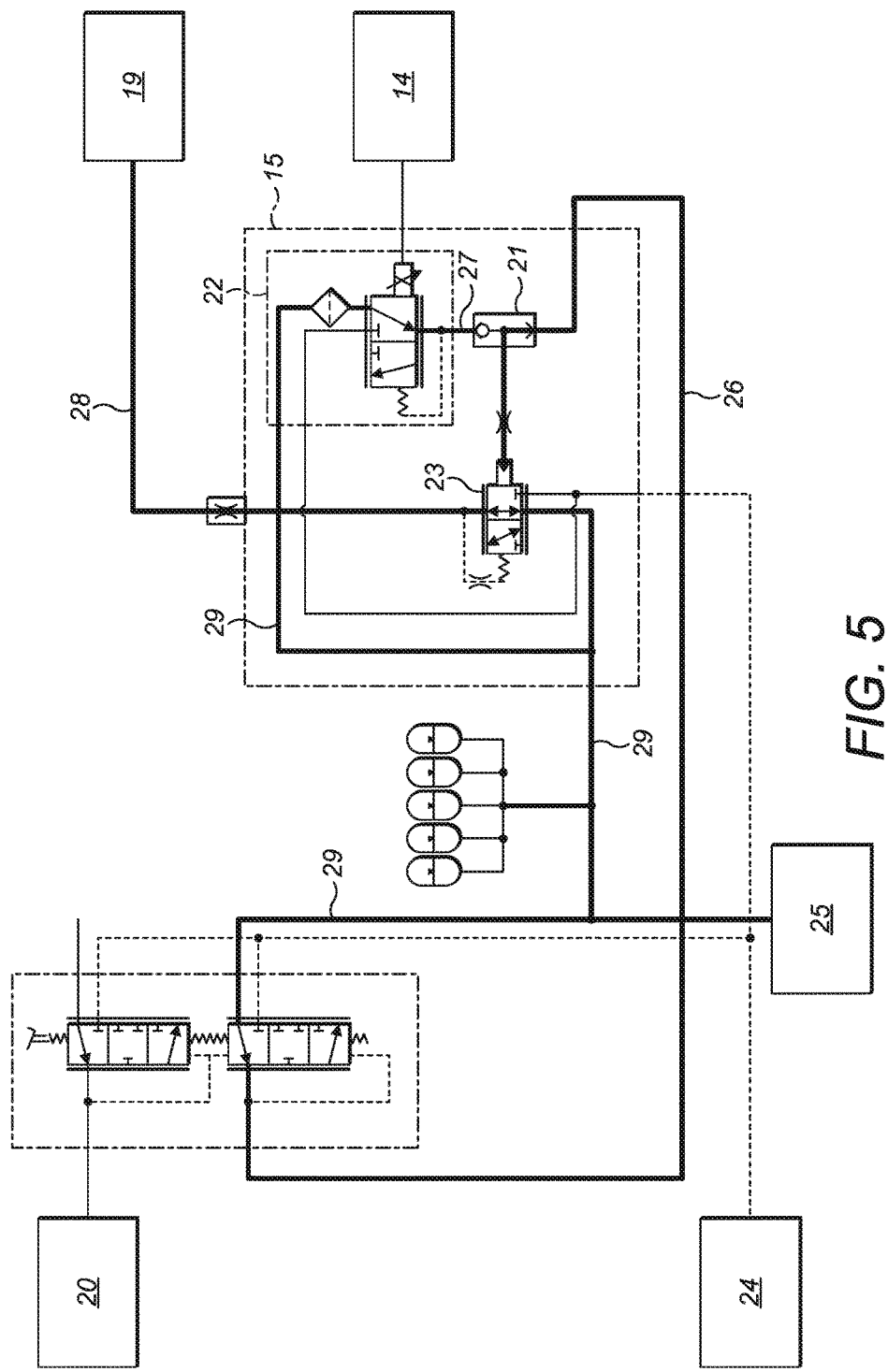
FIGS. 5-6 are diagrams of the braking system of FIG. 1 in one operational mode and another operational mode.
Figure 6:
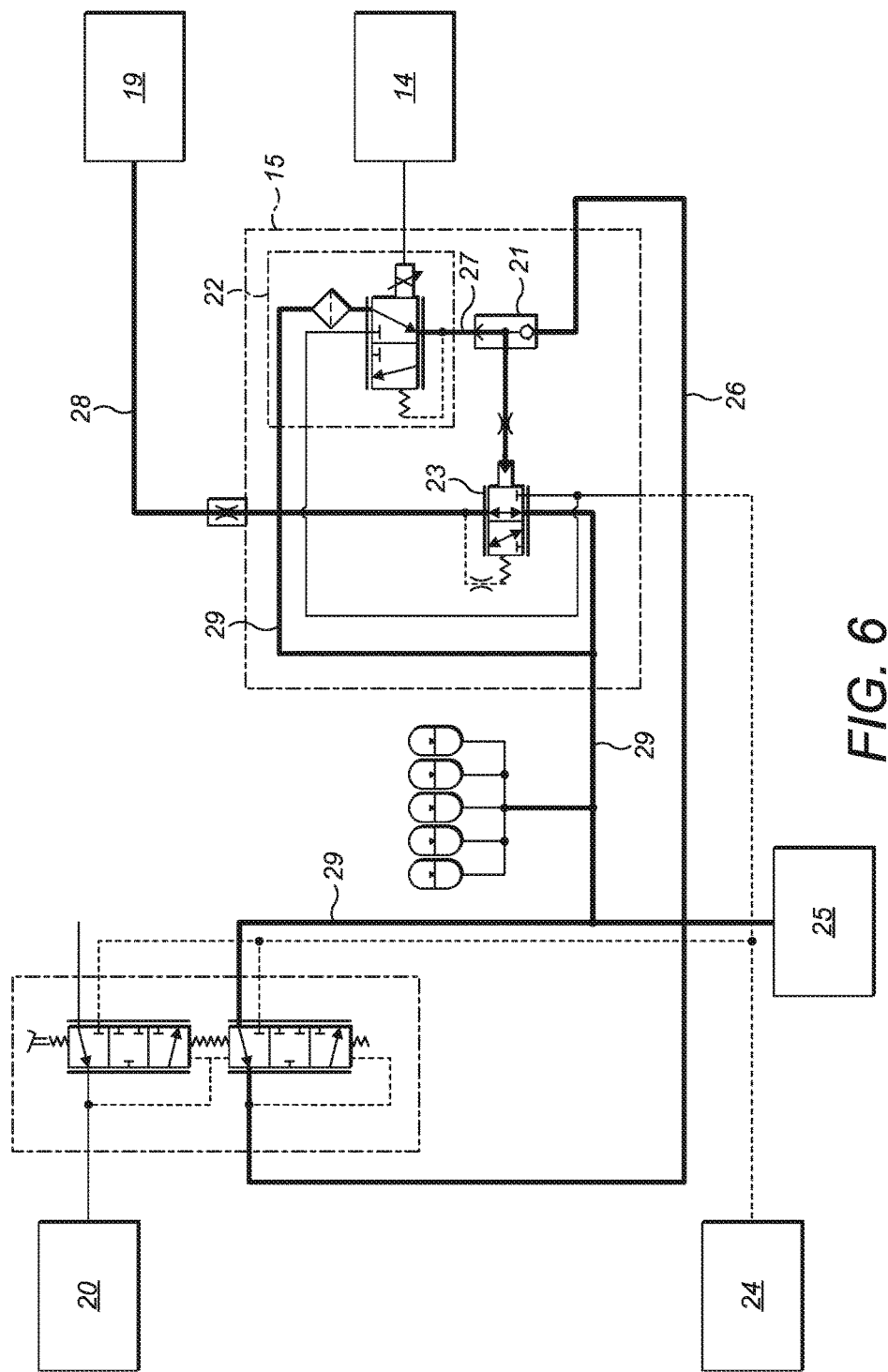
Figure 7:
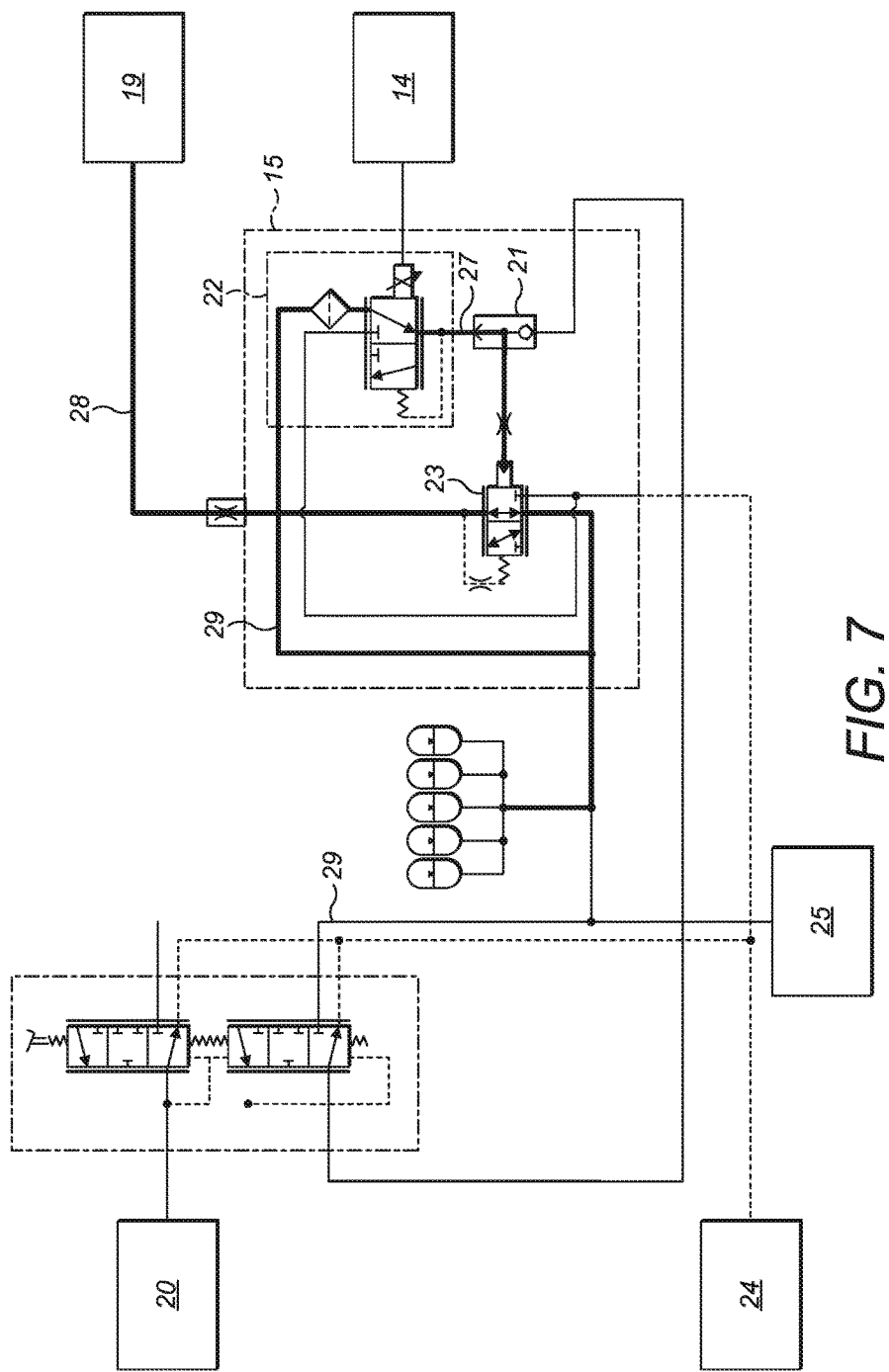
FIG. 7 is a diagram of the braking system of FIG. 1 with the waiting brake function active.

FIG. 5 illustrates the condition where the actuator signal pressure 26 is higher than the ARC valve pressure signal 27 and FIG. 6 illustrates the reverse condition. FIG. 7 illustrates the condition where the waiting brake function is active.

The waiting brake function may be disengaged in a number of different ways. The waiting brake user interface 12 may be deactivated manually by the operator before moving the transmission gear select lever 16 out of neutral mode into a drive mode. This may be effected by pressing the switch 18 or other waiting brake user interface 12, which will disengage the waiting brake function. The control logic may also require that the switch 18, or other waiting brake user interface 12, is pressed and held for a minimum period, before the waiting brake function is deactivated. A suitable minimum period may be 0.5 seconds. The control logic may also require that a brake mechanism 11 is applied before the switch 18, or other waiting brake user interface 12, is pressed.

Alternatively the operator may simply move the transmission gear select lever 16 out of neutral mode into a drive mode, and the movement of the transmission gear select lever 16 deactivates the waiting brake user interface 12.

The disengagement of the waiting brake function may also engage another vehicle control system, such as the Hill Start system described in US-A-2013/0238210. The Hill Start system only becomes active when the vehicle is stationary and a drive gear is selected. The brake mechanism 11 actuated by the Hill Start system remains engaged until the operator applies sufficient throttle to propel the vehicle up a grade on which the vehicle has been parked and the vehicle control system activates to prevent the vehicle from rolling down a grade.

The braking system 10 may be configured to ensure that a brake mechanism 11 is manually engaged by the operator by means of the appropriate brake actuator before the waiting brake user interface 12 can be deactivated. Thus, if the service brake 19 is the brake mechanism 11 used in the waiting brake function, the operator must apply the service brake actuator 20 to manually engage the service brake 19 before pressing the switch 18, which would otherwise disengage the service brake 19 as a waiting brake.

The waiting brake function may also be disengaged if the vehicle ignition is switched off. In this embodiment the braking system 10 may be configured to automatically apply the parking brake.

The vehicle 2 may be provided with one or more displays 30, which may be conveniently located on the dash board. These displays may typically display key operational data, such as vehicle speed, engine speed, gear temperatures and the like. Another display 30 may provide a graphical interface, which may provide details of diagnostics or events or a rear camera view which is activated on reversing. The (or one) display 30 may provide an indication to the operator when the waiting brake function has been activated, for example by means of a status lamp. The braking system 10 may also be configured to provide a warning, for example an illuminated symbol on the display 30, an audible sound or a flashing light, if the waiting brake function has been engaged for a predetermined period. The (or one) display may also provide a warning message in the event of a system fault with the waiting brake function. Such a message may include information on what the issue is, the severity of the fault and what action may be taken to resolve the issue.

The braking system 10 may comprise a failsafe mode. In this mode, the control logic may require that, if a brake mechanism 11 is engaged and one of a number of predetermined fault conditions is detected, an additional brake mechanism 11 may be automatically engaged by the computer control unit 14. For example, if the waiting brake function has been activated (which may be utilising the brake mechanism 11 of the service brake 19) and a predetermined fault condition is detected, the braking system 10 may automatically engage the parking brake. In another example, if the service brake 19 is engaged under operator control and a predetermined fault condition is detected, the braking system 10 may automatically engage the parking brake. The brake mechanism 11, which is engaged when the predetermined faults condition is detected, may be automatically disengaged when the additional brake mechanism 11 is engaged.

The predetermined fault conditions may be detected by the computer control unit 14 and may be the failure of a component, such as a valve failure or a hydraulic pipe burst, which would result in a detectable change in the braking system pressure. The predetermined fault condition may be the failure of a vehicle system or sub-system. The predetermined fault condition may be that the engine speed drops below a threshold speed or shuts down, as lack of engine operation may automatically deactivate a brake mechanism 11 such as the waiting brake function. The predetermined fault condition may be that the ground speed of the vehicle is above a minimum pre-set speed for a pre-set minimum period of time. The minimum pre-set transmission output speed may be 500 rpm and the minimum period of time may be 1 second. The predetermined fault condition may be that the brake pressure of the engaged brake mechanism 11 drops below a predetermined threshold.

Information relating to the predetermined fault condition may be displayed on the display 30.

INDUSTRIAL APPLICABILITY

If the operator of the vehicle 2 wishes to come to a temporary stop, he may slow the vehicle 2 down initially, using the compression brake. To complete the stopping process, the operator may manually engage a brake mechanism 11, such as the service brake 19, by operating an actuator such as the service brake actuator 20. When the vehicle 2 is stationery or moving at a very slow speed, the operator may then move the transmission gear select lever 16 to put the transmission system 6 into neutral mode and engage the waiting brake function by activating the switch 18 or other user interface 12. If the computer control unit 14 determines that the required conditions are met, according to the control logic, the waiting brake function may be engaged. FIG. 7 illustrates the condition when the waiting brake function is active. The computer control unit 14 maintains engagement of the brake mechanism 11 used in the waiting brake function, to enable the operator to release the service brake actuator 20 or other actuator. The vehicle 2 may now be held stationery, whether it is stopped on a grade or a relatively flat surface, without the operator having to hold down the service brake actuator 20 or other actuator.

When the wait is over, and the operator wishes to move off, he may be required to maintain engagement of the brake mechanism 11 used in the waiting brake function by depressing the service brake actuator 20 or other brake actuator. He may then disengage the waiting brake function by deactivating the switch 18 or other user interface 12 and release the service brake actuator 20 or other brake actuator. Thus all brake mechanisms 11 are released enabling the vehicle to move off.

Alternatively he may simply select the appropriate drive mode by means of the transmission gear select lever 16 which automatically deactivates the switch 18 or other user interface 12 and disengages the waiting brake function. This enables the vehicle to move off.

Another vehicle control system, such as a Hill Start system, may be activated by the disengagement of the waiting brake function by means of the switch 18, or other user interface 12, or selecting a drive mode.

The invention claimed is:

1. A vehicle comprising:
   a brake mechanism;
   a computer control unit including a control logic for operation of the brake mechanism; and
   an automatic transmission system having a plurality of drive modes and a neutral mode, said automatic transmission system comprising a dual function device, said dual function device being configured such that:
   when the dual function device is activated when the automatic transmission system is in a drive mode, the automatic transmission system is maintained in that drive mode;
   when the dual function device is activated when the automatic transmission system is in the neutral mode, the brake mechanism is engaged; and
   the computer control unit monitoring an engine speed and a transmission output speed, the computer control unit and the control logic requiring the engine speed being above a pre-set minimum engine speed and the transmission output speed being below a pre-set maximum transmission output speed before allowing the dual function device to engage the brake mechanism.

2. The vehicle as claimed in claim 1, in which the dual function device is a switch activated by a user manually articulating the switch to an on position.

3. The vehicle as claimed in claim 2, in which the brake mechanism is engaged after the switch is articulated to the on position to activate the dual function device for a minimum pre-set period.

4. The vehicle as claimed in claim 1, in which the dual function device is a switch de-activated by a user manually articulating the device switch to an off position.

5. The vehicle as claimed in claim 4, in which the dual function device is de-activated after the switch is articulated to the off position for a minimum pre-set period.

6. The vehicle as claimed in claim 3, in which the minimum pre-set period is 0.5 seconds.

7. The vehicle as claimed in claim 1, in which when the transmission system is in neutral mode, the dual function device is only activatable after the said brake mechanism, or another brake mechanism, has been engaged by a brake actuator.

8. The vehicle as claimed in claim 1, in which the dual function device is de-activated when a mode of the transmission system is changed from a neutral mode to a drive mode.

9. The vehicle as claimed in claim 1, in which the vehicle has an engine and the dual function device is only activatable when-the pre-set minimum engine speed being 500 rpm for the pre-determined time of 2 seconds and the pre-set maximum transmission output speed being 30 rpm is detected by the computer control unit.

10. The vehicle as claimed in claim 1, in which the vehicle has an engine and the dual function device is de-activated when the engine is switched off.

11. The vehicle as claimed in claim 1, in which the transmission system further comprises a transmission gear select lever for changing the transmission system mode and the dual function device is mounted on the transmission gear select lever.

12. A method of engaging a brake mechanism in a vehicle having a braking system, a computer control unit, and an automatic transmission system having at least one drive mode and a neutral mode, said method comprising the steps of:
    placing the automatic transmission system in neutral mode; and
    activating a dual function device, said dual function device being configured such that:
    when the dual function device is activated when the automatic transmission system is in a drive mode, the transmission system is maintained in that drive mode;
    when the dual function device is activated when the automatic transmission system is in the neutral mode, the brake mechanism is engaged; and
    the computer control unit monitoring an engine speed and a transmission output speed, the computer control unit including a control logic for operating the brake mechanism, the control logic requiring the engine speed being above a pre-set minimum engine speed and the transmission output speed being below a pre-set maximum transmission output speed before allowing the dual function device to engage the brake mechanism.

13. The method of engaging a brake mechanism as claimed in claim 12, further comprising the step of operating a brake actuator to engage the said brake mechanism or another brake mechanism before activating the dual function device.

14. The method of engaging a brake mechanism as claimed in claim 12, in which the dual function device is a switch activated by a user manually articulating the switch to an on position.

15. The method of engaging a brake mechanism as claimed in claim 14, in which the brake mechanism is engaged after the switch is articulated to the on position to activate the dual function device for a minimum pre-set period.

16. The method of engaging a brake mechanism as claimed in claim 12, in which the dual function device is a switch de-activated by a user manually articulating the switch to an off position.

17. The method of engaging a brake mechanism as claimed in claim 16, in which the dual function device is de-activated after the switch is articulated to the off position for a minimum pre-set period.

18. The method of engaging a brake mechanism as claimed in claim 15, in which the minimum pre-set period is 0.5 seconds.

19. The method of engaging a brake mechanism as claimed in claim 12, in which, when the transmission system is in neutral mode, the dual function device is only activatable after the said brake mechanism, or another brake mechanism, has been engaged manually.

20. The method of engaging a brake mechanism as claimed in claim 12, in which the dual function device is de-activated when a mode of the transmission system is changed from a neutral mode to a drive mode.

21. The method of engaging a brake mechanism as claimed in claim 12, in which the vehicle has an engine and the dual function device is only activatable when the engine pre-set minimum speed being 500 rpm for the pre-determined time of 2 seconds and the transmission pre-set maximum output speed being 30 rpm is detected by the computer control unit.

22. The method of engaging a brake mechanism as claimed in claim 12, in which the vehicle has an engine and the dual function device is de-activated when the engine is switched off.

* * * * *